(12) United States Patent
Dion et al.

(10) Patent No.: US 9,464,592 B2
(45) Date of Patent: Oct. 11, 2016

(54) PISTON THERMAL MANAGEMENT IN AN OPPOSED-PISTON ENGINE

(71) Applicant: Achates Power, Inc., San Diego, CA (US)

(72) Inventors: Eric P. Dion, Encinitas, CA (US); Ryan G. MacKenzie, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 240 days.

(21) Appl. No.: 13/891,523

(22) Filed: May 10, 2013

(65) Prior Publication Data

US 2014/0090625 A1    Apr. 3, 2014

Related U.S. Application Data

(60) Provisional application No. 61/646,784, filed on May 14, 2012.

(51) Int. Cl.

| | |
|---|---|
| *F02F 3/16* | (2006.01) |
| *F16J 1/00* | (2006.01) |
| *F01P 1/04* | (2006.01) |
| *F02F 3/18* | (2006.01) |
| *F01P 3/06* | (2006.01) |
| *F02F 3/22* | (2006.01) |
| *F02B 75/28* | (2006.01) |
| *F02F 3/00* | (2006.01) |

(52) U.S. Cl.
CPC .. *F02F 3/16* (2013.01); *F01P 1/04* (2013.01); *F02F 3/18* (2013.01); *F16J 1/00* (2013.01); *F01P 3/06* (2013.01); *F02B 75/282* (2013.01); *F02F 3/22* (2013.01); *F02F 2003/0061* (2013.01)

(58) Field of Classification Search
CPC ............... F02F 3/16; F02F 3/18; F02F 3/20; F02F 3/22; F02F 3/26; F02F 5/00; F16J 1/00; F16J 1/01; F16J 1/005; F01P 1/04; F01P 3/06
USPC ........... 123/41.35, 51 B, 193.6; 92/174, 176, 92/186
See application file for complete search history.

(56) References Cited

U.S. PATENT DOCUMENTS

| | | | |
|---|---|---|---|
| 2,494,748 A | 1/1950 | Ernestus | |
| 4,253,430 A | 3/1981 | Garter et al. | 123/41.38 |
| 4,270,494 A | 6/1981 | Garter et al. | 23/41.35 |
| 4,356,800 A * | 11/1982 | Moebus | 123/193.6 |
| 4,553,472 A | 11/1985 | Munro et al. | |

(Continued)

FOREIGN PATENT DOCUMENTS

| | | |
|---|---|---|
| EP | 2577015 B1 * | 11/2013 |
| GB | 1028847 | 5/1966 |

(Continued)

OTHER PUBLICATIONS

International Search Report and Written Opinion for PCT/US2014/037289, mailed Aug. 20, 2014.

*Primary Examiner* — Grant Moubry
(74) *Attorney, Agent, or Firm* — Terrance A. Meador; Julie J. Muyco

(57) ABSTRACT

An opposed-piston engine includes pistons, each piston having an annular cavity in the piston's sidewall and positioned between its crown and ring grooves to block transfer of heat from the crown to the piston body.

6 Claims, 9 Drawing Sheets

(56) References Cited

U.S. PATENT DOCUMENTS

| | | | |
|---|---|---|---|
| 4,614,150 A * | 9/1986 | Deutschmann | 92/221 |
| 4,651,631 A * | 3/1987 | Avezou | 92/224 |
| 4,870,733 A * | 10/1989 | Kawabata et al. | 29/888.046 |
| 5,724,933 A | 3/1998 | Silvonen et al. | 123/193.6 |
| 6,003,479 A * | 12/1999 | Evans | 123/41.31 |
| 6,244,161 B1 * | 6/2001 | Myers | C22C 38/12 92/224 |
| 6,904,876 B1 * | 6/2005 | Hofbauer et al. | 123/46 R |
| 6,938,604 B2 * | 9/2005 | Gabriel et al. | 123/193.6 |
| 7,654,240 B2 | 2/2010 | Jarrett et al. | 123/193.6 |
| 7,669,560 B2 * | 3/2010 | Elsbett | 123/50 B |
| 7,743,745 B2 * | 6/2010 | Scharp | 123/193.6 |
| 7,900,551 B2 * | 3/2011 | Benz et al. | 92/186 |
| 7,938,093 B2 | 5/2011 | Rasmussen | 123/193.6 |
| 7,987,831 B2 | 8/2011 | Seifried | 123/193.6 |
| 8,001,946 B2 | 8/2011 | Leitl | 123/193.6 |
| 2007/0209614 A1 * | 9/2007 | Scharp | 123/41.67 |
| 2008/0134876 A1 * | 6/2008 | Scharp | 92/168 |
| 2008/0134879 A1 | 6/2008 | Hofbauer | |
| 2010/0218673 A1 * | 9/2010 | Ribeiro | 92/181 R |
| 2011/0271932 A1 | 11/2011 | Fuqua et al. | 123/301 |
| 2012/0073526 A1 | 3/2012 | Dion et al. | 123/41.44 |

FOREIGN PATENT DOCUMENTS

| | | | |
|---|---|---|---|
| GB | 2209014 A * | 4/1989 | B22D 19/0027 |
| JP | 60173346 A * | 9/1985 | |
| WO | WO-2006/056315 | 6/2006 | |
| WO | WO 2011131266 A1 * | 10/2011 | |

* cited by examiner

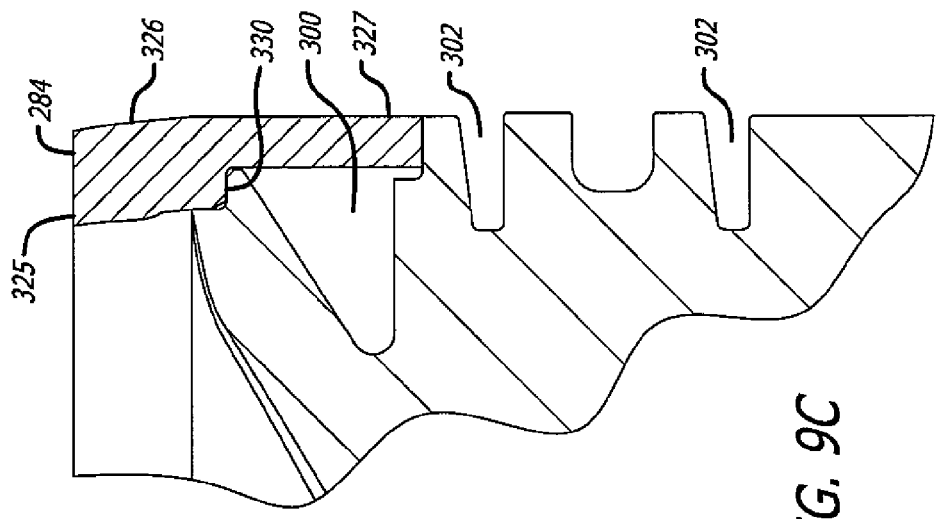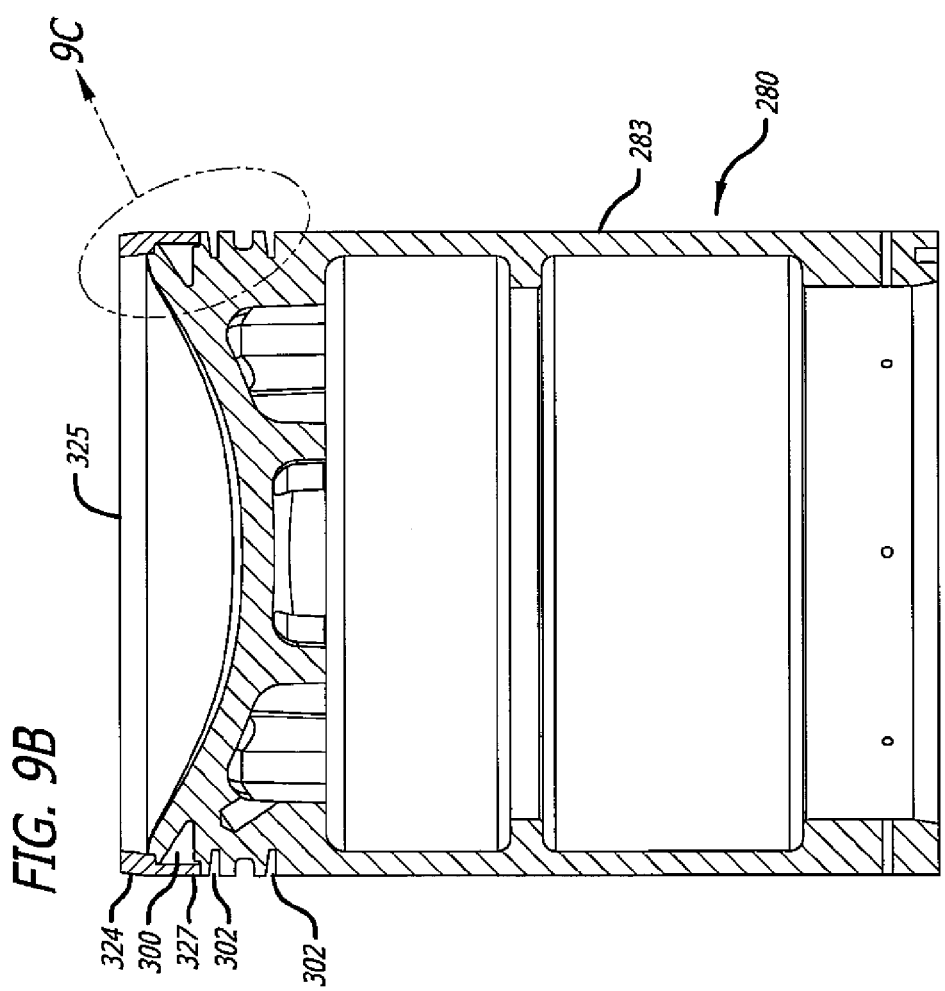

US 9,464,592 B2

PISTON THERMAL MANAGEMENT IN AN OPPOSED-PISTON ENGINE

PRIORITY

This application claims priority to U.S. provisional application for patent 61/646,784, filed May 14, 2012.

A CROSS REFERENCE TO RELATED APPLICATIONS

This application contains subject matter related to that of commonly-owned U.S. patent application Ser. No. 13/066,589, filed Apr. 18, 2011 for "Combustion Chamber Constructions for Opposed-Piston Engines" and commonly-owned U.S. patent application Ser. No. 13/136,955, filed Aug. 15, 2011 for "Piston Constructions for Opposed-Piston Engines".

BACKGROUND

The field is internal combustion engines. Particularly the field is related to constructions for thermal management of pistons. In some aspects, the field includes internal combustion engines in which the end surface of a piston crown is insulated from the ring area of the piston. In some other aspects, the field includes high compression diesel engines, particularly opposed-piston diesel engines.

During operation of an internal combustion engine, combustion of an air/fuel mixture occurs in cylinder space defined by the end surface on the crown of at least one piston reciprocating in the cylinder. For example, in an opposed-piston engine, combustion occurs in the cylinder space defined between the end surfaces on the crowns of two opposed pistons near respective top dead center positions in a cylinder. The heat of air compressed between the end surfaces of the crowns causes fuel injected into the heated air to burn. The cylinder space where fuel combusts is typically referred to as a "combustion chamber".

In order to maximize the conversion of the energy released by combustion into motion, it is desirable to prevent heat from being conducted away from the combustion chamber through the piston. Reduction of heat lost through the piston increases the engine's operating efficiency. Typically, heat transfer through the piston is reduced or blocked by insulating the piston crown from the body of the piston. However, it is also the case that retention of the heat of combustion at the end surface of the piston can cause thermal damage to the piston crown and nearby piston elements.

Piston thermal management is a continuing problem, especially given the ever-increasing loads expected from modern internal combustion engines. In a typical piston, at least four areas are of concern for thermal management: the piston crown, the ring grooves, the piston under-crown, and the piston/wristpin interface. The piston crown can be damaged by oxidation if its temperature rises above the oxidation temperature of the materials of which it is made. Mechanical failure of piston elements can result from thermally-induced material changes. The rings and ring grooves and the lands that border the ring grooves can suffer from carbon build-up caused by oil heated above the coking temperature. As with the ring grooves the under surface of the piston crown can also suffer from oil coking.

A recent study indicates that an opposed-piston engine two-stroke cycle engine exhibits increased thermal efficiency when compared with a conventional six-cylinder four-cycle engine. (Herold, R., Wahl, M., Regner, G., Lemke, J. et al., "Thermodynamic Benefits of Opposed-Piston Two-Stroke Engines," SAE Technical Paper 2011-01-2216, 2011, doi:10.4271/2011-01-2216.) The opposed-piston engine achieves thermodynamic benefits by virtue of a combination of three effects: reduced heat transfer due to a more favorable combustion chamber area/volume ratio, increased ratio of specific heats from leaner operating conditions made possible by the two-stroke cycle, and decreased combustion duration achievable at the fixed maximum pressure rise rate arising from the lower energy release density of the two-stroke engine. With two pistons per cylinder, an opposed-piston engine can realize additional thermodynamic benefits with enhanced piston thermal management.

SUMMARY

Enhanced thermal management of the pistons of an opposed-piston engine is realized by provision, in each piston of a pair of opposed pistons, of an annular cavity positioned between the end surface of the piston's crown and the top ring groove of the piston. During engine operation, this cavity reduces the transfer of heat from the piston crown to the piston body, while at the same time reducing or preventing thermal damage to the rings and coking of lubricant in the ring grooves.

BRIEF DESCRIPTION OF THE DRAWINGS

FIG. 9B is a side sectional drawing of the second embodiment of the piston of FIG. 5, with the sleeve seated on the crown. FIG. 9C is a magnified view of a portion of the piston of FIG. 9B.

DETAILED DESCRIPTION OF THE PREFERRED EMBODIMENTS

FIGS. 1-4 illustrate a combustion chamber construction defined by complementary end surface structures of opposed pistons disposed in a ported cylinder of an opposed piston engine. The combustion chamber construction is bordered by squish surface areas. Identical generally symmetrical bowls are formed in the end surfaces of the opposed pistons, and the pistons are rotationally oriented to place complementary curved surfaces of the bowls in opposition in order to maximize the squish surface areas of the squish zone.

The end surface structure of each piston has a periphery surrounding a bowl defining a concave surface. The concave surface includes a first portion curving away from a plane containing the periphery surface toward the interior of the piston and a second portion curving away from the first portion and protruding outwardly in part from the plane. A convex surface opposite the bowl curves away from the periphery and protrudes outwardly from the plane. The convex surface meets the second portion of the concave surface to form a ridge therewith. Preferably, but not necessarily, the bowl has a semi-ellipsoidal shape. The end surface structure is provided on both pistons and the pistons are disposed in the bore of a ported cylinder with their end surfaces oriented to place complementary curved surfaces of the end surface structures in opposition in order to define a combustion chamber. Preferably, but not necessarily, the combustion chamber space defined between these two end surfaces is, or is very close to, an elongated ellipsoidal cylinder, providing a generally symmetrical geometry to reinforce and sustain the tumble motion. This combustion chamber structure adds a tumble to the bulk motion of air in the combustion chamber, thereby increasing turbulence which enhances air/fuel mixing.

Figure 1:
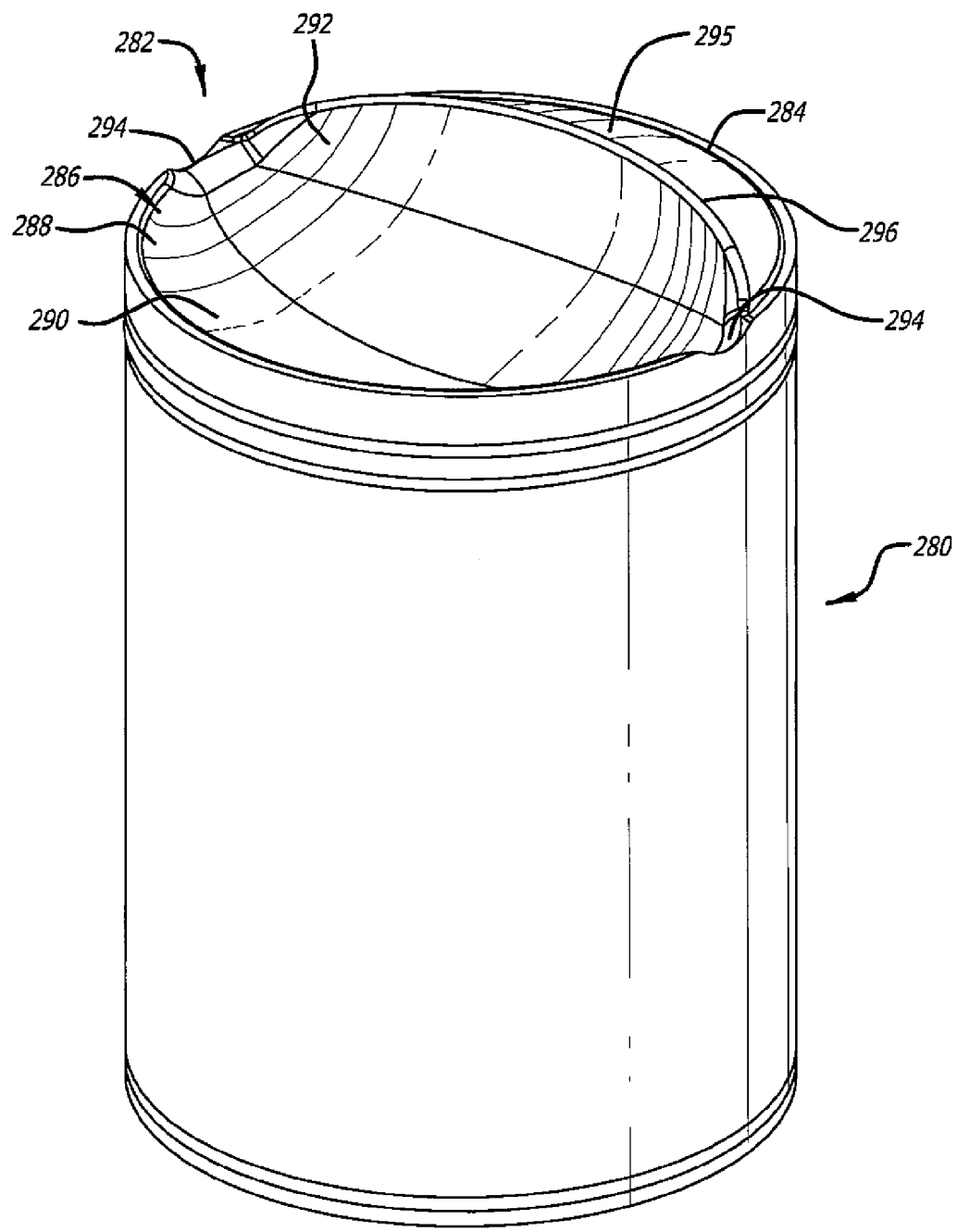
FIG. 1 is an elevational perspective view of a piston of a pair of pistons in which end surfaces of the pair of pistons are formed to define a combustion chamber construction of an opposed-piston engine.

The structures of the piston end surfaces that define the combustion chamber are essentially identical to each other; accordingly, the piston 280 shown in FIG. 1 represents both intake and exhaust pistons. The piston 280 has an end surface 282. A flat, radially-extending area 284 centered on the longitudinal axis of the piston 280 defines a periphery of the end surface 282. A bowl 286 is formed within the periphery. The bowl 286 has a concave surface 288 with a first portion 290 curving inwardly from a plane containing the flat circumferential area 284, toward the interior of the piston 280, and a second portion 292 curving outwardly from the interior of the piston through the plane. The end surface 282 further includes a convex surface 295 within the periphery that curves outwardly from the plane. The convex surface 295 meets the second portion 292 of the concave surface 288 to form a ridge 296 that protrudes outwardly from the end surface 282. At least one notch 294 extends through the periphery into the bowl 286; preferably two aligned notches 294 are provided.

Figure 2:
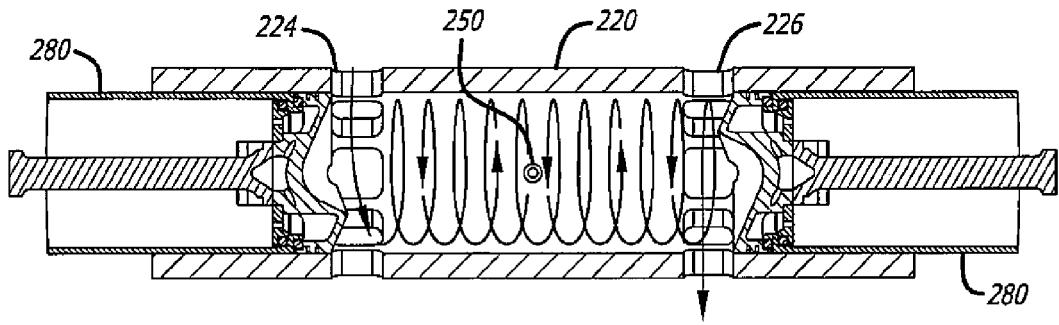
FIGS. 2-4 are side sectional drawings showing an operational sequence of an opposed-piston engine including a pair of pistons according to FIG. 1.
Figure 3:
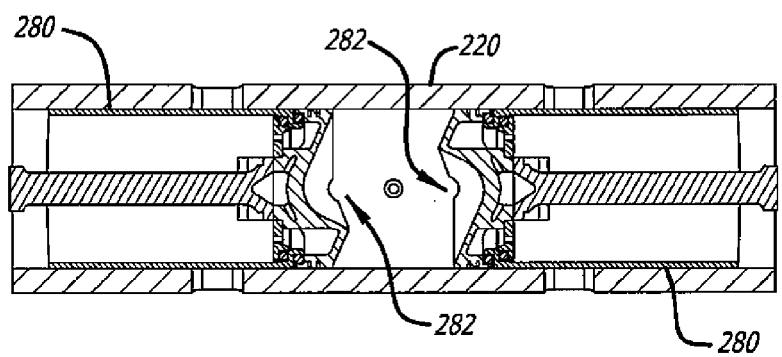
Figure 4:
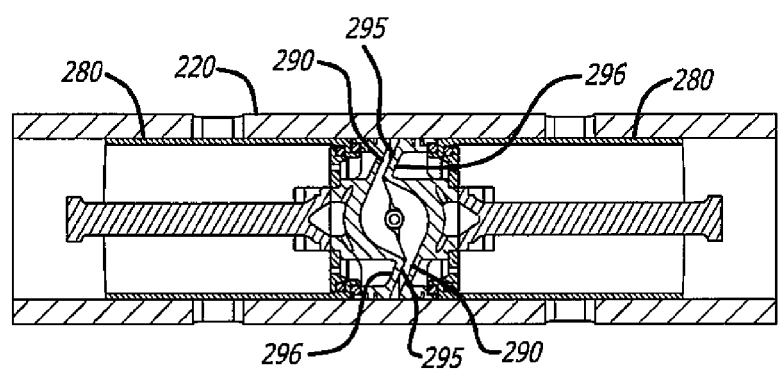

Referring now to FIG. 2-4, two pistons 280 having end surfaces shaped as per FIG. 1 are shown at or near respective bottom dead center (BDC) locations within a ported cylinder 220. The pistons are rotationally oriented in the bore of the cylinder 220 so as to align the end surfaces in complement; that is to say, the concave surface portion 290 of one piston 280 faces the convex surface 295 of the other piston. Charge air is forced through the intake port 224 into the cylinder, as exhaust products flow out of the cylinder through the exhaust port 226. For purposes of scavenging and air/fuel mixing, the charge air is caused to swirl as it passes through the intake port 224. As the pistons 280 move from BDC toward top dead center (TDC) locations as per FIG. 3, the intake and exhaust ports 224 and 226 close and the swirling charge air is increasingly compressed between the end surfaces 282. As the pistons 280 approach TDC, compressed air flows from the peripheries of the end surfaces into a combustion chamber having a cavity defined between the end surface bowls. At the same time, compressed charge air nearer the longitudinal axis of the cylinder continues to swirl. As the pistons 280 move through their respective TDC locations, the opposing concave-convex surfaces 290, 295 mesh with one another to give the combustion chamber cavity an elongated, generally ellipsoidal shape. Opposing pairs of notches 294 (see FIG. 1) in the end surfaces 282 define injection ports that open into the combustion chamber at opposing pole positions of the ellipsoidal shape.

Figure 5:
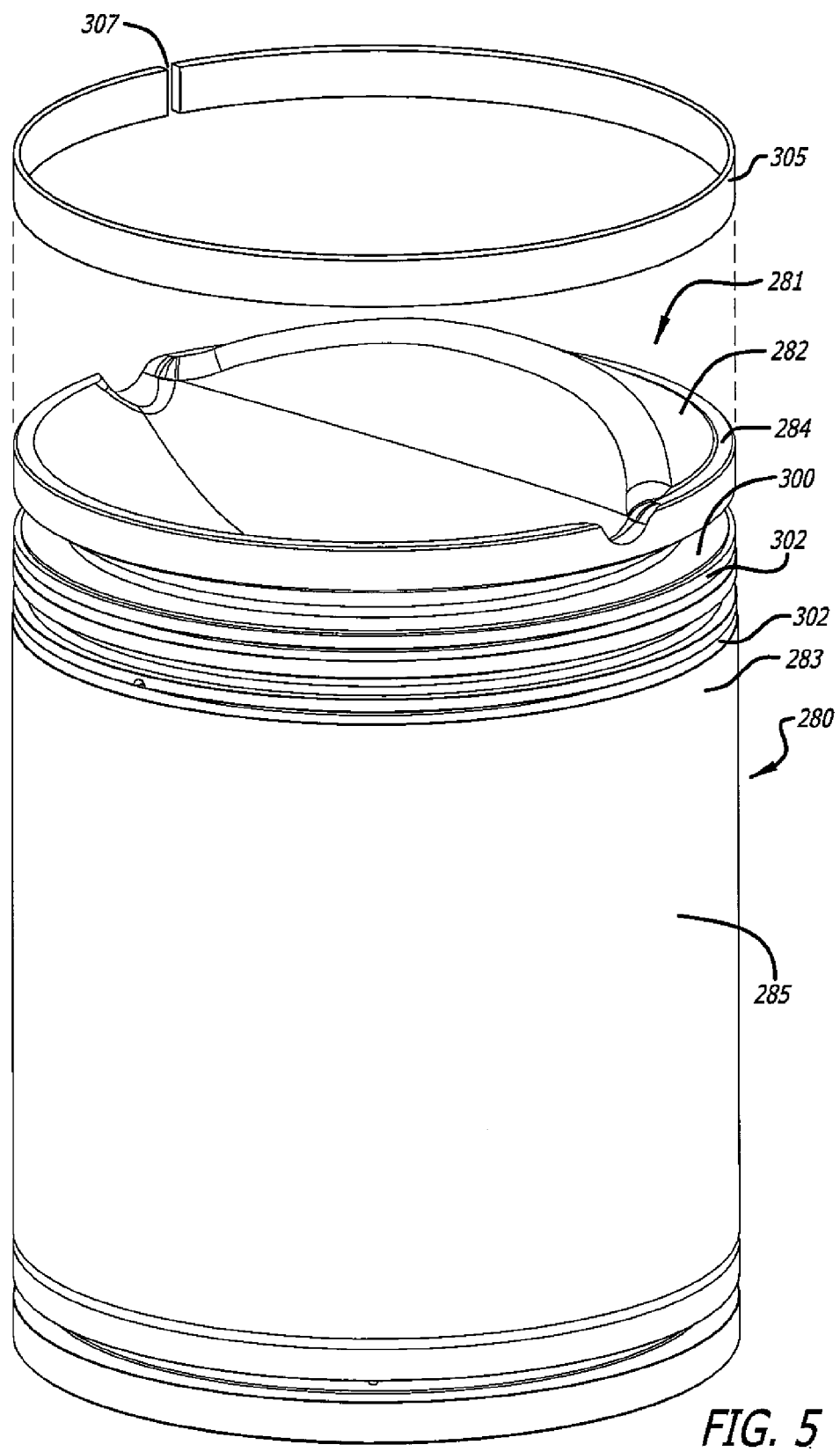
FIG. 5 is an elevational perspective view of one piston of a pair of pistons of an opposed-piston engine.

As per FIG. 5, the piston end surface 282 is formed in a crown 281 at the upper end of the piston 280. One or more ring grooves 302 are formed in the sidewall 283 of the body 285 of the piston 280, underneath the periphery 284 of the end surface 282. Piston rings (not shown) are seated in the ring grooves when the piston is fully assembled. A circumferential groove, recess, trench, or cavity 300, formed along a circumference of the piston sidewall 283, is positioned between the end surface 282 and the top ring groove. The cavity 300 reduces or blocks transfer of heat from the crown through the lower part of the piston, functioning as a thermal resistor between the crown 281 and the ring grooves 302. A thermally resistant material is disposed in the cavity 300. Preferably, but not necessarily, the cavity 300 contains a material with low thermal conductivity. Examples of a low thermal conductivity material include air, ceramics, and/or graphite. Preferably, the cavity 300 is closed to form an annular chamber. For example, the cavity 300 can be closed by a thin, flat encircling strip, or band, 305 that is seated in the mouth of the cavity and fixed to the piston structure. Closing the cavity 300 and/or filing the cavity 300 with ceramic, graphite, or other equivalent material adds structural integrity to the piston. The cavity 300 provides a thermal resistance between the crown 281 and the ring grooves 302 that reduces the transfer of heat into the piston, thereby increasing the conversion of the combustion energy into motion.

The thermal resistance of the cavity will cause the crown 281 to become hotter, thereby increasing the possibility of oxidation. This can be handled in several ways. One is to manufacture the crown out of a material with a higher oxidizing temperature such as a stainless steel or nickel alloy. The other is to use standard piston materials and apply a surface treatment which increases the surface oxidation temperature of the material. Material properties also degrade with temperature. If standard piston materials are used, the piston can be designed with low enough stress to still satisfy fatigue limits.

Figure 6:
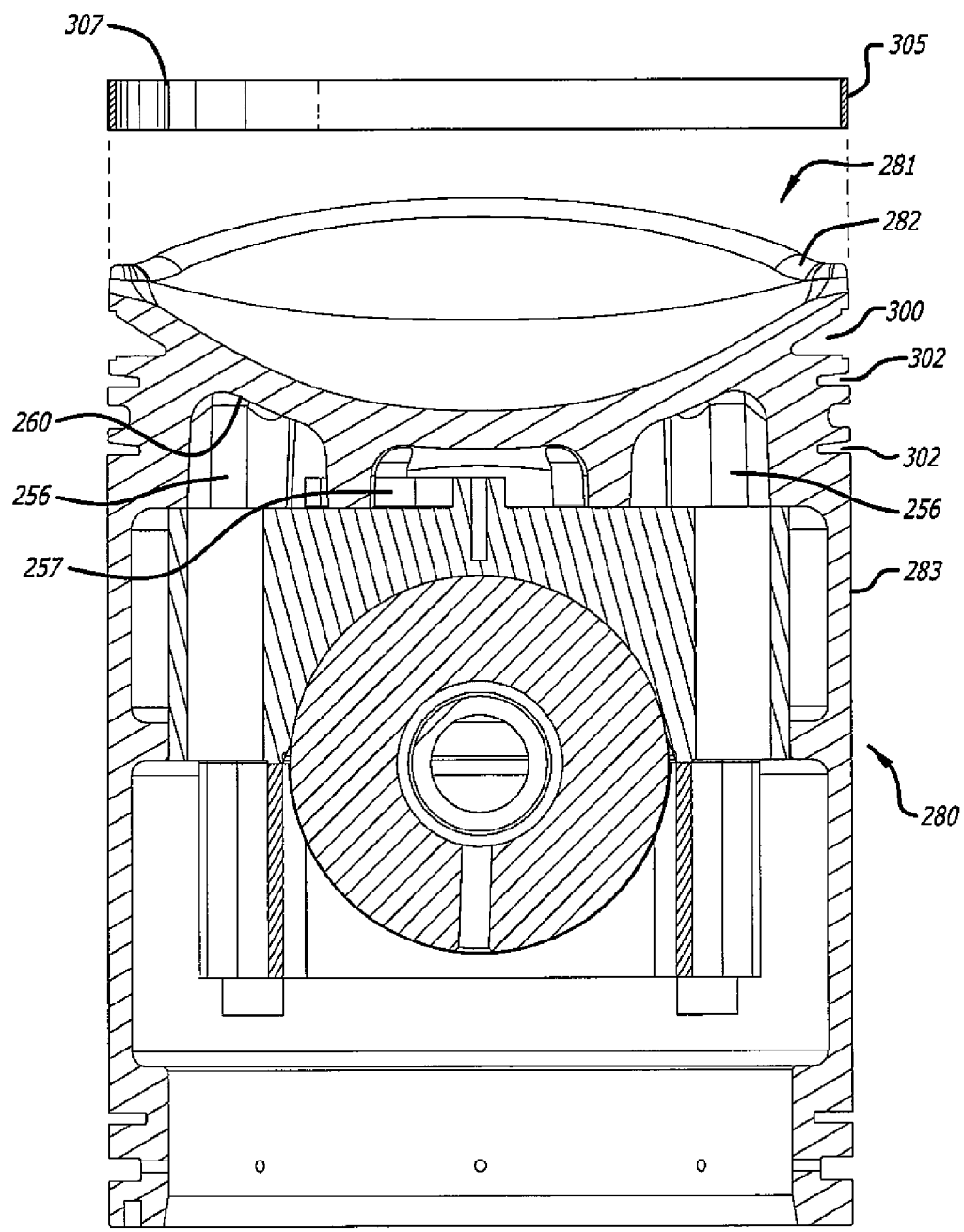
FIG. 6 is a side sectional drawing of a first embodiment of the piston of FIG. 5 showing an annular cavity positioned between the end surface of the piston's crown and the top ring groove of the piston.
Figure 7:
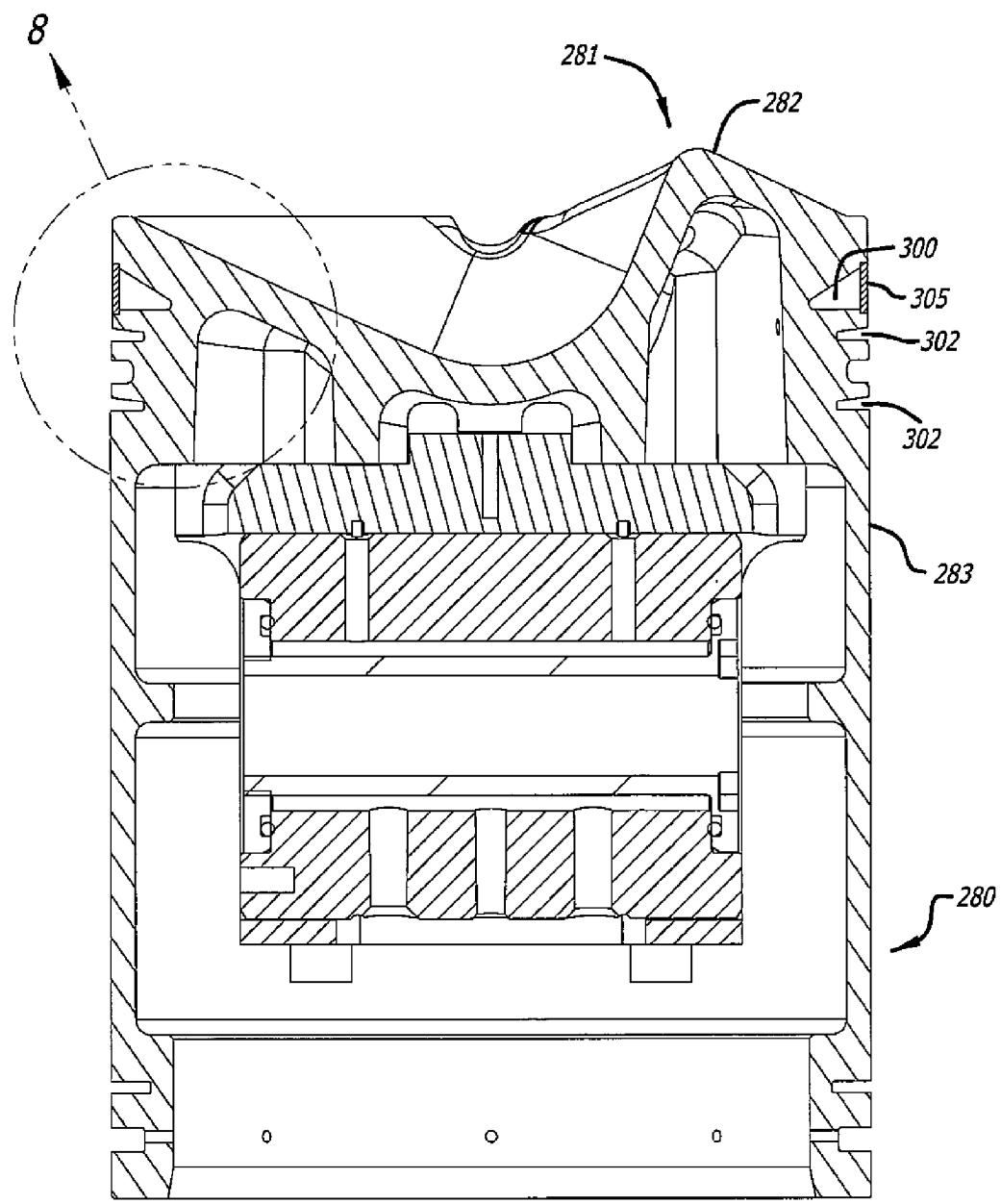
FIG. 7 is a side sectional drawing of the piston of FIG. 6 when the piston is rotated 90° on its axis.
Figure 8:
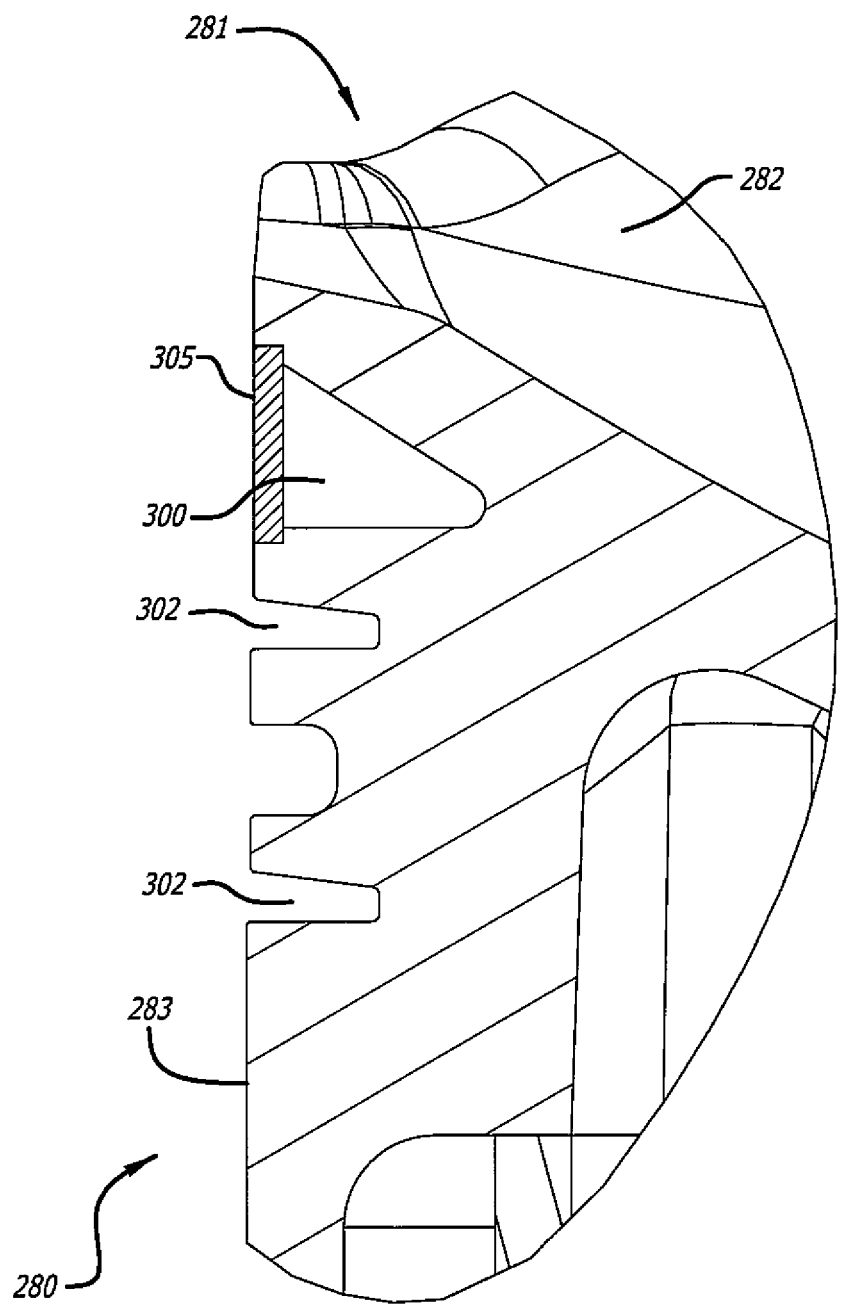
FIG. 8 is a magnified view of a portion of the piston of FIG. 6.

FIGS. 6-8 illustrate a first embodiment of the piston of FIG. 5. The annular cavity 300 is positioned between the end surface of the piston's crown 281 and the top ring groove 302 of the piston. Preferably, but not necessarily, the cavity has the shape of a wedge in cross section, with a wide mouth that opens through the piston sidewall and tapers to an inner notch. Preferably, but not necessarily, the sidewall 283 and crown 281 are formed as a single unitary piece by forging, casting and/or machining. Alternately, the crown and piston body can be formed as separate pieces that are joined by standard means such as welding, brazing, or threaded elements. If the cavity 300 is closed with the band 305, the band is preferably made from a material that is thermally compatible with the material of the piston structure to which it is mounted. For example, materials with equal, or substantially equal, coefficients of thermal expansion, are said to be "thermally compatible." Presuming the use of standard materials for the piston and the band, the band 305 can be seated in the mouth of the cavity 300 and welded in place. If the crown and piston body are formed as a unitary piece, the band 305 can be fabricated with a gap 307 (best seen in FIG. 5), thereby allowing it to be expanded slightly so as to fit around the crown and moved downwardly therealong until seated in the mouth of the cavity 300. Once the band is seated, the gap 307 can be closed by the same process by with which the band is welded to the piston body. Once the band 305 is seated and fixed in place by welding or an equivalent process, the two parts 300 and 305 cooperate to form a chamber that is substantially airtight. The chamber can be filled with one or more materials having low thermal conductivity. Alternatively, air can be drawn from the cavity during the welding process such that the chamber contains a near-vacuum, that is to say, an annular space having a pressure less than atmospheric pressure at sea level.

Figure 9A:
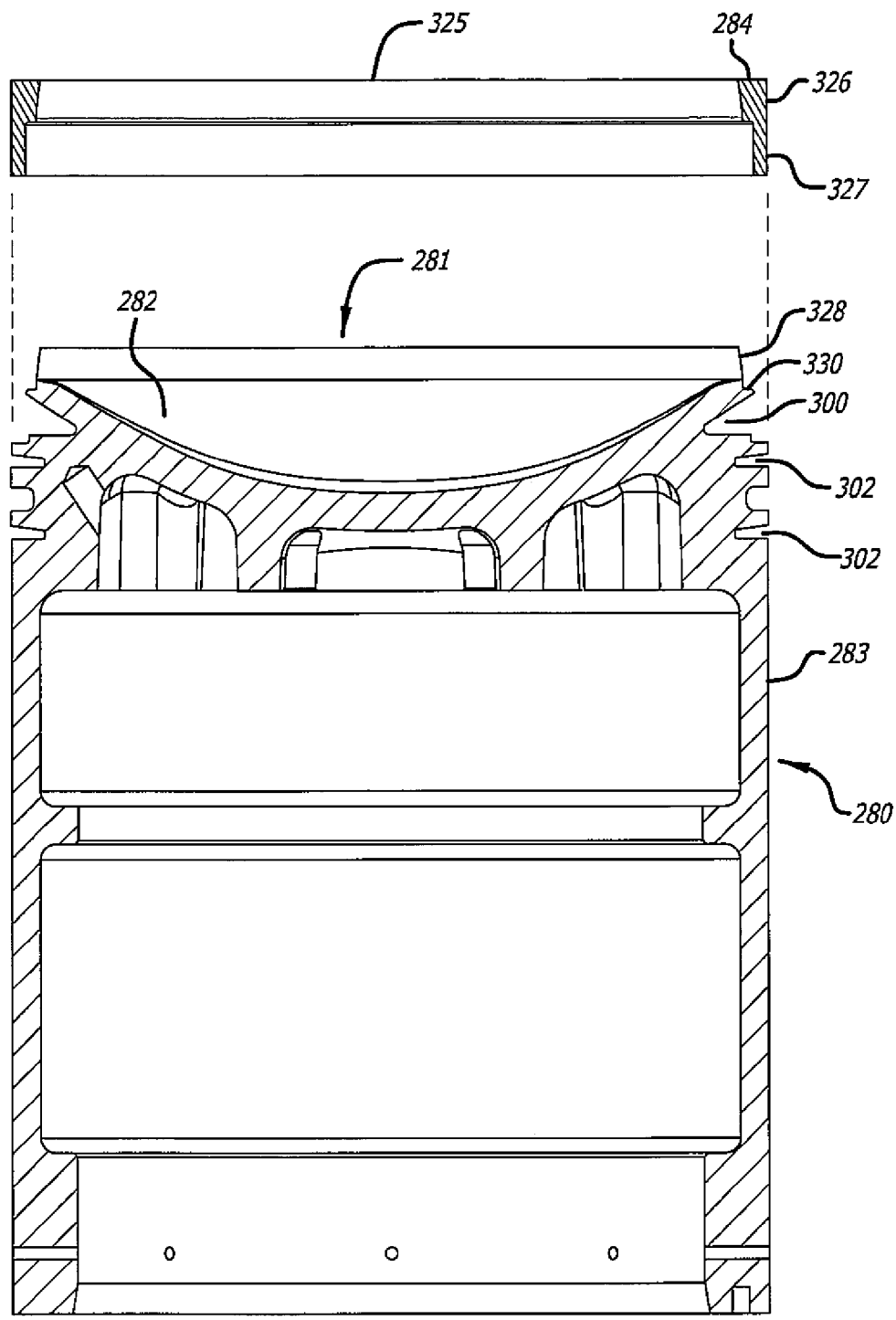
FIG. 9A is an exploded side sectional drawing of a second embodiment of the piston of FIG. 5 showing a tubular part, or sleeve, that is received on the crown and seats in place around the piston's end surface so as to close the annular cavity.

FIGS. 9A-9C illustrate a second embodiment of the piston of FIG. 5. The annular cavity 300 is positioned between the end surface of the piston's crown 281 and the top ring groove 302 of the piston. Preferably, but not necessarily, the cavity has the shape of a wedge in cross section, with a wide mouth that opens through the piston sidewall and tapers to an inner notch. Preferably, but not necessarily, the sidewall 283 and crown 281 are formed as a single unitary piece by forging, casting, and/or machining. Alternately, the crown and piston body can be formed as separate pieces that are joined by standard means such as welding, brazing, or threaded elements. The cavity 300 is closed with a sleeve 325 having an upper flange 326 that extends in a radial direction and a lower flange 327 that extends downwardly in an axial direction. The sleeve 325 is assembled to an outer circumferential surface 328 the crown 281, with the upper flange 326 held against a peripheral shoulder 330 and the lower flange 327 seated in and covering the mouth of the cavity 300. As per FIGS. 9A-9C, the upper flange 326 of the sleeve 325 constitutes the periphery 284 of the piston's end surface. The sleeve 325 is preferably made from a material that is thermally compatible with the material of the piston structure to which it is mounted. Presuming the use of standard materials for the piston and the sleeve, the sleeve 325 can be seated on the crown, with the lower flange seated in the mouth of the cavity 300, and fixed in place by welding or an equivalent process. Once the sleeve 325 is seated and fixed in place, with the seam between the lower flange 327 and the mouth of the cavity 300 closed by welding or an equivalent process, the two parts 300 and 327 form a chamber that is substantially airtight. The chamber can be filled with one or more materials having low thermal conductivity. Alternatively, air can be drawn from the cavity during the welding process such that the chamber contains a near-vacuum, that is to say, an annular space having a pressure less than atmospheric pressure at sea level.

Figure 10:
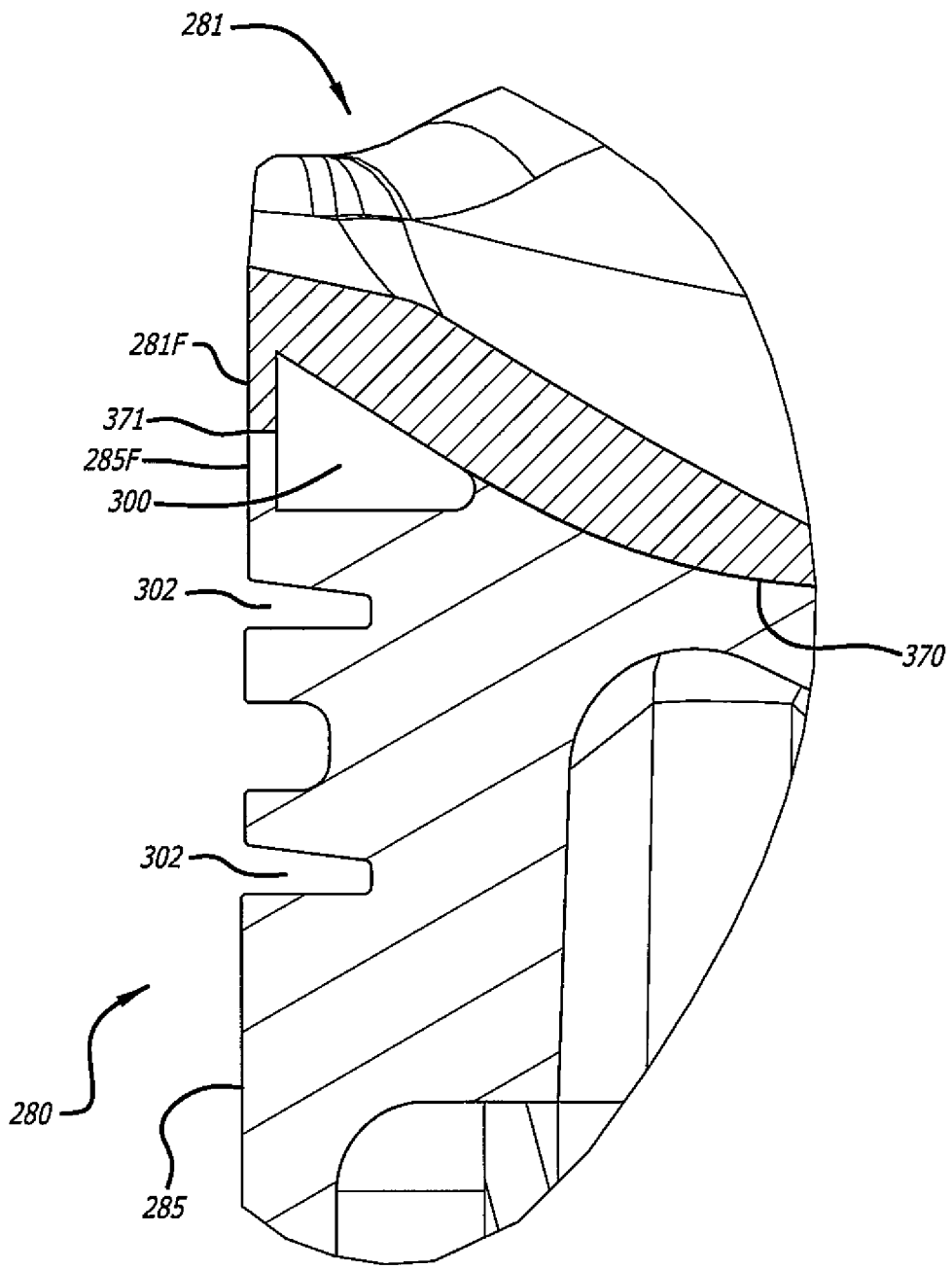
FIG. 10 is a magnified partial view of a third embodiment of the piston of FIG. 5.

FIG. 10 illustrates a third embodiment of the piston of FIG. 5. In this embodiment, the crown 281 and piston body 285 are formed separately, with oppositely-directed, axially-extending flanges 281f and 285f. The crown 281 and piston body 285 are brought together, with the pair of flanges 281f, 285f in alignment, while being welded along weld lines 370 and 371. The cavity 300 thereby formed includes space on the insides of the flanges 281f, 285f. If an electron beam welding process a near-vacuum can be created in the resulting chamber. Two useful mass production methods include inertia welding and laser welding, either of which can be used to join the crown and body pieces.

In some aspects, provision can be made to cool the interior of each piston by means of liquid coolant that circulates into the piston, across the backside of the crown, and out the bottom of the piston body. For example, with reference to FIG. 6, liquid coolant (lubricating oil, for example) flows into an annular gallery 256. The liquid coolant strikes the interior surface of the annular gallery at its highest point 260, thereby cooling that portion of the crown by impingement, and flows from there throughout the annular gallery 256. From the annular gallery 256, the liquid coolant flows into and through a central gallery 257. Liquid coolant flowing throughout the annular gallery 256 washes and cools an annular portion of the piston sidewall that includes ring grooves 302. Liquid coolant flowing through the central gallery 257 continuously irrigates an interior portion of the crown undersurface. See related application Ser. No. 13/066,589 in this regard.

Although a piston having a cavity to block transfer of heat from the crown to the lower part of the piston has been described with reference to presently preferred embodiments, it should be understood that various modifications can be made without departing from the spirit of the described principles. For example, the piston can have a bowl of various other shapes than as described and illustrated herein. Accordingly, the principles are limited only by the following claims.

The invention claimed is:

1. An internal combustion engine including at least one cylinder with longitudinally-separated exhaust and intake ports and a pair of pistons disposed in opposition to one another in a bore of the cylinder, each piston including a piston body with a crown at one end, an end surface on the crown, in which an end surface of a first piston has a bowl that cooperates with the end surface of an opposing piston to define a combustion chamber, at least one ring groove in the piston sidewall near the crown, an annular thermally-resistant cavity formed in the piston sidewall along a circumference of the piston body and positioned between the end surface and the at least one ring groove, and one of a band, a flange, and a pair of opposing flanges covering the cavity to form a chamber that contains a near-vacuum.

2. The piston of claim 1, wherein the pair of opposing flanges comprises an upper flange that extends in a radial direction of the piston and a lower flange that extends downwardly in an axial direction of the piston, further wherein:
a sleeve comprises the upper flange and lower flange, and
the sleeve is seated on an outer circumferential surface of the crown with the upper flange held against a shoulder of the crown and the lower flange covering the cavity.

3. The piston of claim 1, further including one or more cooling galleries within the piston body under the crown.

4. A piston for a two-stroke internal combustion engine, comprising:
a piston body with a crown at one end;
an end surface formed on the crown;
the end surface including an elongated bowl that cooperates with an opposing piston end surface to define a combustion chamber;
at least one ring groove in the piston sidewall near the crown;
an annular thermally-resistant cavity formed in the piston sidewall, extending along a circumference of the piston body, and positioned between the end surface and the at least one ring groove; and,
one of a band, a flange, and a pair of opposing flanges covering the cavity to form a chamber that contains a near-vacuum.

5. The piston of claim 4, wherein the pair of opposing flanges comprises an upper flange that extends in a radial direction of the piston and a lower flange that extends downwardly in an axial direction of the piston, further wherein:
a sleeve comprises the upper flange and lower flange, and the sleeve is seated on an outer circumferential surface of the crown with the upper flange held against a shoulder of the crown and the lower flange covering the cavity.

6. The piston of claim 4, further including one or more cooling galleries within the piston body under the crown.

* * * * *